United States Patent
Hughey (10) Patent No.: US 10,697,750 B2
(45) Date of Patent: Jun. 30, 2020

(54) DEVICE AND THREAD GAUGING METHOD FOR ENSURING SPARK PLUG ORIENTATION

(71) Applicant: Ford Motor Company, Dearborn, MI (US)

(72) Inventor: Ethan Hughey, Royal Oak, MI (US)

(73) Assignee: Ford Motor Company, Dearborn, MI (US)

(*) Notice: Subject to any disclaimer, the term of this patent is extended or adjusted under 35 U.S.C. 154(b) by 221 days.

(21) Appl. No.: 15/971,676

(22) Filed: May 4, 2018

(65) Prior Publication Data

US 2019/0339053 A1 Nov. 7, 2019

(51) Int. Cl.
*G01B 5/16* (2006.01)
*G01B 5/20* (2006.01)
*G01B 5/24* (2006.01)
*G01B 5/012* (2006.01)

(52) U.S. Cl.
CPC ............. *G01B 5/163* (2013.01); *G01B 5/012* (2013.01); *G01B 5/204* (2013.01); *G01B 5/24* (2013.01)

(58) Field of Classification Search
CPC ..................................................... G01B 5/163
USPC ........................................................ 33/199 R
See application file for complete search history.

(56) References Cited

U.S. PATENT DOCUMENTS

| | | | |
|---|---|---|---|
| 4,901,687 A | 2/1990 | Jones | |
| 5,020,229 A * | 6/1991 | Schwarz | G01B 5/204 33/199 R |
| 5,179,788 A * | 1/1993 | Jadach | B23Q 17/22 33/520 |
| 8,054,460 B2 | 11/2011 | Agapiou et al. | |
| 8,407,891 B2 | 4/2013 | Owusu et al. | |
| 8,866,369 B2 | 10/2014 | Gfell et al. | |
| 9,322,630 B2 | 4/2016 | Wilkins et al. | |

(Continued)

FOREIGN PATENT DOCUMENTS

DE 10349077 5/2005
JP 5691838 4/2015

OTHER PUBLICATIONS

Spencer, J., Getting the Most Out of Your Ignition: Spark Plug Indexing 101, enginelabs, Jul. 27, 2016, available at URL http://www.enginelabs.com/news/getting-the-most-out-of-your-ignition-spark-plug-indexing-101/.

(Continued)

*Primary Examiner* — Christopher W Fulton
(74) *Attorney, Agent, or Firm* — Burris Law, PLLC (57) ABSTRACT

A method of operating a measurement device to check an internal thread of a spark plug bore for proper orientation of a spark plug includes positioning a cylinder head relative to the measurement device and measuring a seat surface z-position. The seat surface is configured to seat the spark plug within the spark plug bore. The method includes measuring at least one set of coordinates. Each set of coordinates is at a major diameter of a corresponding threadform of the internal thread. The method includes determining a pitch of the internal thread. The method includes calculating a thread start location where the major diameter of the internal thread intersects the seat surface based on the coordinates of the at least one set of coordinates, the pitch of the internal thread, and the z position of the seat surface. The method includes comparing the thread start location to a reference location.

20 Claims, 3 Drawing Sheets

(56) References Cited

U.S. PATENT DOCUMENTS

| | | | | |
|---|---|---|---|---|
| 2001/0034948 A1* | 11/2001 | Matsumiya | ............ | G01B 7/012 33/553 |
| 2007/0240318 A1* | 10/2007 | Matsumiya | ............ | G01B 5/204 33/199 R |
| 2013/0104407 A1* | 5/2013 | Lee | ........................ | G01B 5/163 33/199 R |
| 2016/0303672 A1 | 10/2016 | Onley et al. | | |
| 2017/0141543 A1 | 5/2017 | Thomson et al. | | |

OTHER PUBLICATIONS

Wang, Y., et al., Investigation of Impacts of Spark Plug Orientation on Early Flame Development and Combustion in a DI Optical Engine, Mar. 28, 2017, available at URL https://doi.org/10.4271/2017-01-0680.

* cited by examiner

DEVICE AND THREAD GAUGING METHOD FOR ENSURING SPARK PLUG ORIENTATION

FIELD

The present disclosure relates to a device and thread gauging method for ensuring spark plug orientation.

BACKGROUND

The statements in this section merely provide background information related to the present disclosure and may not constitute prior art.

Spark plugs for internal combustion engines typically include a ground strap that is spaced apart from a central electrode to form the spark plug gap. Controlled electrical arcing across the gap typically provides the ignition spark to ignite compressed air fuel mixture within the combustion chamber. The ground strap is typically connected to one side of the main body of the spark plug. The orientation of the ground strap relative to the intake and exhaust valves of the engine can change the performance (e.g., fuel economy) of the engine by altering the flow patterns of the air-fuel mixture and combustion gasses in the combustion chamber.

Consistently orienting the ground strap in a predetermined and desired rotational location relative to the valves can improve consistency between the performance of different engines during production. The orientation of the ground strap typically depends on the characteristics of the internal threads of the engine cylinder head and the external threads of the spark plug. However, it can be difficult to determine if the internal threads of the cylinder head and the external threads of each individual spark plug are formed to properly orient the spark plug. Typically, a spark plug or gauging plug must be threaded into the cylinder head and torqued to a predetermined value to determine if the threads of the cylinder head are properly oriented. However, such processes can be slow and can produce additional wear on the cylinder head. Repeated use of the spark plug or gauging plug can also wear down the spark plug or gauging plug and cause inaccurate readings.

The device and thread gauging method of the present disclosure overcome these limitations of the typical spark plug gauging process and can ensure a properly oriented spark plug in a first part while reducing wear on the cylinder head.

SUMMARY

In one form, a method of operating a measurement device to check an internal thread of a spark plug bore of a cylinder head for proper orientation of a spark plug in the cylinder head includes positioning the cylinder head relative to the measurement device and measuring a z position of a seat surface. The seat surface is configured to seat the spark plug within the spark plug bore. The method includes measuring at least one set of coordinates. Each set of coordinates is at a major diameter of a corresponding threadform of the internal thread. The method includes determining a pitch of the internal thread. The method includes calculating a thread start location where the major diameter of the internal thread intersects the seat surface based on the coordinates of the at least one set of coordinates, the pitch of the internal thread, and the z position of the seat surface. The method includes comparing the thread start location to a reference location.

According to further form, the method further includes outputting a result of the comparison of the thread start location to the reference location.

According to further form, the method further includes defining the z position of the seat surface as a zero z value.

According to further form, calculating the thread start location includes calculating a rotational overshoot. The rotational overshoot is equal to an angle of rotation between the thread start location and a location corresponding to the at least one set of coordinates.

According to further form, calculating the thread start location includes calculating a rotational offset. The rotational offset is equal to a defined z coordinate of the at least one set of coordinates divided by the thread pitch.

According to further form, calculating the thread start location includes calculating a rotational overshoot. The rotational overshoot is equal to the rotational offset minus a maximum integer value of the rotational offset, then multiplied by 360°.

According to further form, calculating the thread start location includes adding the rotational overshoot to an angular position of the defined z coordinate.

According to further form, the step of measuring the coordinates of the at least one set of coordinates includes moving a probe of a coordinate measuring machine (CMM) within the spark plug bore.

According to further form, the probe is moved in a helical path about the spark plug bore while measuring x, y, and z coordinates of the at least one set of coordinates.

According to further form, the at least one set of coordinates includes a plurality of sets of coordinates and the step of calculating the thread start location includes calculating a plurality of thread start locations. Each thread start location corresponding to one of the sets from the plurality of sets of coordinates.

According to further form, the method further includes averaging the plurality of thread start locations and comparing the average of the plurality of thread start locations to the reference location.

According to further form, the method further includes setting a central axis of the spark plug bore as an x and y coordinate origin.

In another form, a method of operating a measurement device to check an internal thread of a spark plug bore of a cylinder head for proper orientation of a spark plug in the cylinder head includes positioning the cylinder head relative to the measurement device and setting an intersection of a plane of a seat surface and an axis of the bore as a coordinate origin of the measurement device. The seat surface is a surface configured to seat the spark plug within the spark plug bore. The method includes measuring x, y, and z coordinates for a first location. The first location corresponds to a major diameter of a threadform of the internal thread. The method includes determining a pitch of the internal thread. The method includes calculating a thread start location based on the x, y, and z coordinates of the first location and the pitch of the internal thread. The thread start location is a location where the major diameter of the internal thread intersects the seat surface. The method includes comparing the thread start location to a reference location. The method includes outputting a result of the comparison of the thread start location to the reference location.

According to further form, calculating the thread start location includes calculating a rotational offset and a rotational overshoot. The rotational offset is equal to the z coordinate of the first location divided by the thread pitch.

The rotational overshoot is equal to the rotational offset minus a maximum integer value of the rotational offset, then multiplied by 360°.

According to further form, calculating the thread start location includes adding the rotational overshoot to an angular position of the first location.

According to further form, the method further includes measuring x, y, and z coordinates for a plurality of measured locations. Each of the measured locations corresponds to a major diameter of a threadform of the internal thread. The first location is one of the plurality of measured locations. The method includes calculating a plurality of thread start locations based on the x, y, and z coordinates of the plurality of measured locations and the pitch of the internal thread. Each thread start location is calculated based on the coordinates of a corresponding one of the measured locations. The method includes calculating an average thread start location from the plurality of thread start locations. The method includes comparing the average thread start location to the reference location.

According to further form, the step of measuring x, y, and z coordinates for a plurality of measured locations includes moving a probe in a helical path about the spark plug bore while measuring the coordinates of the plurality of measured locations.

In another form, a thread gauging device includes a support surface, a probe, a base, a display, and a control module. The support surface is configured to support a cylinder head. The probe is configured to be received in a spark plug bore of the cylinder head and detect characteristics of the spark plug bore. The base is attached to the probe and configured to move the probe relative to the cylinder head. The control module is in communication with the base, the probe, and the display. The control module is configured to send control signals to the base to control movement of the probe relative to the cylinder head. The control module is configured to receive signals from the probe indicative of the characteristics of the spark plug bore. The control module is configured to move the probe to measure a z position of a seat surface of the spark plug bore. The control module is configured to move the probe to measure at least one set of coordinates. Each set of coordinates is at a major diameter of a corresponding threadform of an internal thread within the spark plug bore. The control module is configured to determine a pitch of the internal thread and calculate a thread start location where the major diameter of the internal thread intersects the seat surface based on the coordinates of the at least one set of coordinates, the pitch of the internal thread, and the z position of the seat surface. The control module is configured to compare the thread start location to a reference location. The control module is configured to operate the display to output a result of the comparison of the thread start location to the reference location.

According to a further form, the probe is a touch probe configured to detect characteristics of the spark plug bore by contact between the probe and the spark plug bore.

According to a further form, the probe and control module cooperate to detect x, y, and z coordinates of the characteristics of the spark plug bore.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
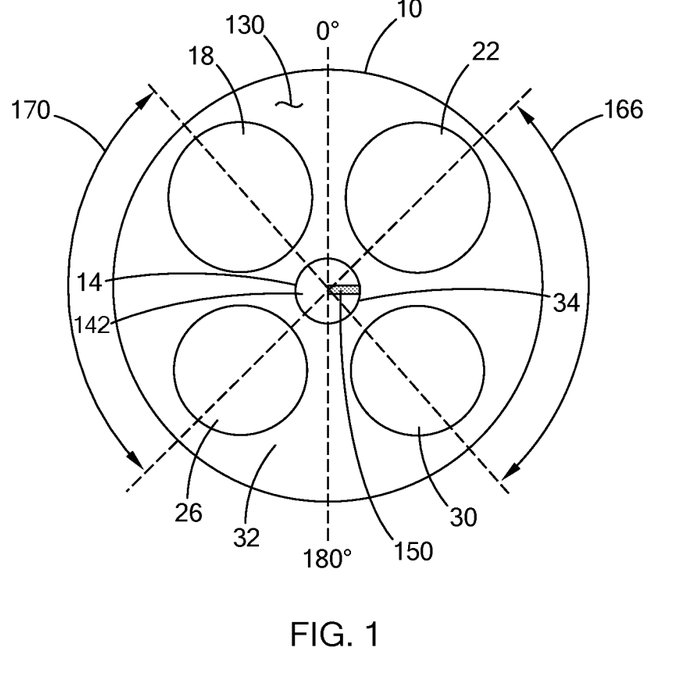
FIG. 1 is a bottom plan view of a portion of an engine cylinder head and spark plug in accordance with the teachings of the present disclosure.
Figure 2:
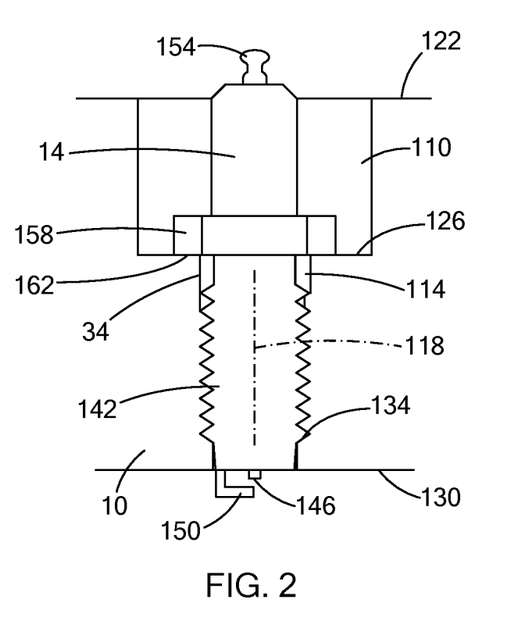
FIG. 2 is a sectional view of the cylinder head and spark plug of FIG. 1.

With reference to FIGS. 1 and 2, a portion of an internal combustion engine is illustrated. The engine includes a cylinder head 10, a spark plug 14, a pair of intake valves 18, 22 and a pair of exhaust valves 26, 30 that form a top of a combustion chamber 32 of the engine. The intake valves 18, 22 are adjacent to each other and disposed on one side of the combustion chamber 32, while the exhaust valves 26, 30 are adjacent to each other and disposed on the opposite side of the combustion chamber 32. In the example provided, the cylinder head 10 includes a threaded spark plug bore 34 that is approximately in the center of the combustion chamber 32 and the spark plug 14 is threaded into the spark plug bore 34. The spark plug bore 34 is counterbored such that it includes a counterbore portion 110 and a threaded portion 114 coaxially disposed about an axis 118 of the spark plug bore 34. The counterbore portion 110 has a maximum diameter that is greater than the threaded portion 114. The counterbore portion 110 is open through an outer surface 122 of the cylinder head 10 and extends axially into the cylinder head 10 until a seat surface 126. In the example provided, the seat surface 126 is generally perpendicular to the axis 118.

One end of the threaded portion 114 is open through the seat surface 126 into the counterbore portion 110 and the other end of the threaded portion 114 is open through an inner surface 130 of the cylinder head 10 to be open into the combustion chamber 32. In the example provided, the threaded portion 114 includes a single internal thread 134 that revolves helically about the axis 118 to produce a plurality of threadforms when viewed in cross-section as shown in FIG. 2. In other words, the internal threading of the spark plug bore 34 is a single start thread. The internal thread 134 starts in the spark plug bore 34 at a location that is axially between the seat surface 126 and the inner surface 130 and extends helically about the axis 118 toward the inner surface 130. In the example provided, the internal thread 134 terminates before reaching the inner surface 130.

The spark plug 14 includes a main body 142, an electrode 146, a ground strap 150, a terminal 154, and a head 158. The main body 142 is threaded with an external thread that mates with the internal thread 134 of the spark plug bore 34. The electrode 146 is disposed at a center of the main body 142 and within the combustion chamber 32 when the main body 142 is threaded into the spark plug bore 34. The ground strap 150 is attached to a side of the main body 142 and extends radially inward to overlap the electrode 146. The electrode 146 and ground strap 150 are spaced apart to define a spark gap within the combustion chamber 32. The head 158 has a generally hexagonal shape configured to receive torque from a tool (not shown; e.g., a socket). The head 158 extends radially outward of the main body 142 and has a surface 162 that is generally perpendicular to the axis 118. The surface 162 is configured to oppose and contact on the seat surface 126 when the spark plug 14 is fully threaded into the spark plug bore 34. The head 158 is axially between the main body 142 and the terminal 154. The terminal 154 is configured to be attached to a spark plug wire (not shown) to receive electrical power therefrom.

In the example provided in FIG. 1, a 0° axis is defined as equally between the intake valves 18, 22 and the ground strap 150 is shown oriented at a 90° orientation so that it is perpendicular to the 0° axis. It has been found that orienting the ground strap 150 within the angular regions denoted by reference numeral 166 or 170 (e.g., approximately 41°-139° or 221°-319° can result in improved flow dynamics within the combustion chamber 32 when compared to other orientations since the ground strap 150 interferes less with the intake and exhaust flow of the gasses in the combustion chamber 32. It can be beneficial to verify that the internal thread 134 of the spark plug bore 34 is properly formed to ensure the proper orientation of the spark plug 34 without actually inserting the spark plug 34 to directly check its orientation.

Figure 3:
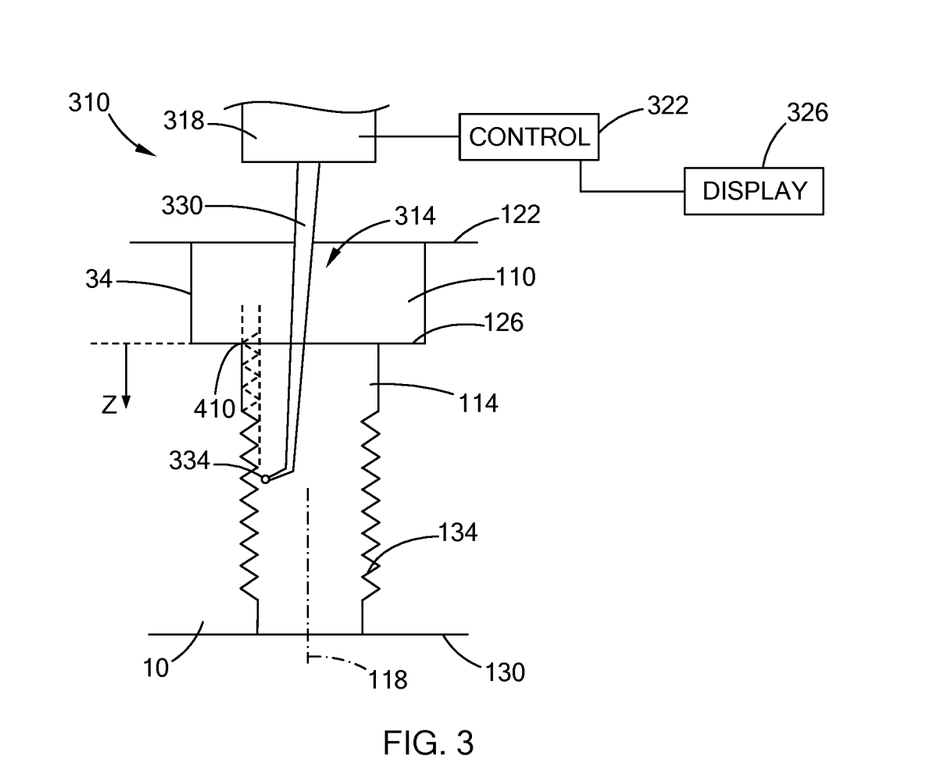
FIG. 3 is a sectional view of the cylinder head of FIG. 1 and a measuring device in accordance with the teachings of the present disclosure.

With additional reference to FIG. 3, a portion of a measurement device 310 is illustrated with the cylinder head 10. The measurement device 310 includes a probe 314, a base 318, a control module 322, and a display 326. In the example provided, the measurement device 310 is a coordinate measuring machine (CMM) and the probe 314 is a touch probe including an arm 330 and a tip 334, though other types of probes can be used (e.g., laser scanning probe). The tip 334 can be any suitable shape and size configured to detect the locations of the major and minor diameter of the threadforms of the internal thread 134. In the example provided, the tip 334 has a generally spherical shape with a diameter less than thread pitch of the internal thread 134. The tip 334 is coupled to one end of the arm 330. The other end of the arm 330 is coupled to the base 318. The base 318 is configured to move the arm 330 and thus move the tip 334 in any direction. With additional reference to FIG. 4, the spark plug bore 34 is shown from a top down view. In the example provided, the base 318 is configured to move the probe in an x direction, a y direction, and a z direction, with the z direction being along the axis 118. The base 318 can also rotate the arm about an axis parallel to the axis 118. The base 318 is also configured to output signals representative of the position of the tip 334.

The control module 322 is coupled to the base 318 for communication with the base 318. The control module 322 is configured to control the movement of the arm 330 and to receive the signals output from the base 318 that are representative of the position of the tip 334. The control module 322 is configured to output signals to the display 326 to cause the display 326 to show a desired output. In the example provided, the display 326 is a monitor or screen capable of showing text and/or images. In an alternative configuration, the display 326 can be an indicator light or lights. The display 326 can also be configured to output audio indicators. In the example provided, the display 326 is also a touch screen capable of receiving input from a user (not shown). Alternatively, separate user input interfaces (not shown; e.g., buttons or a keyboard) can be used.

Figure 5:
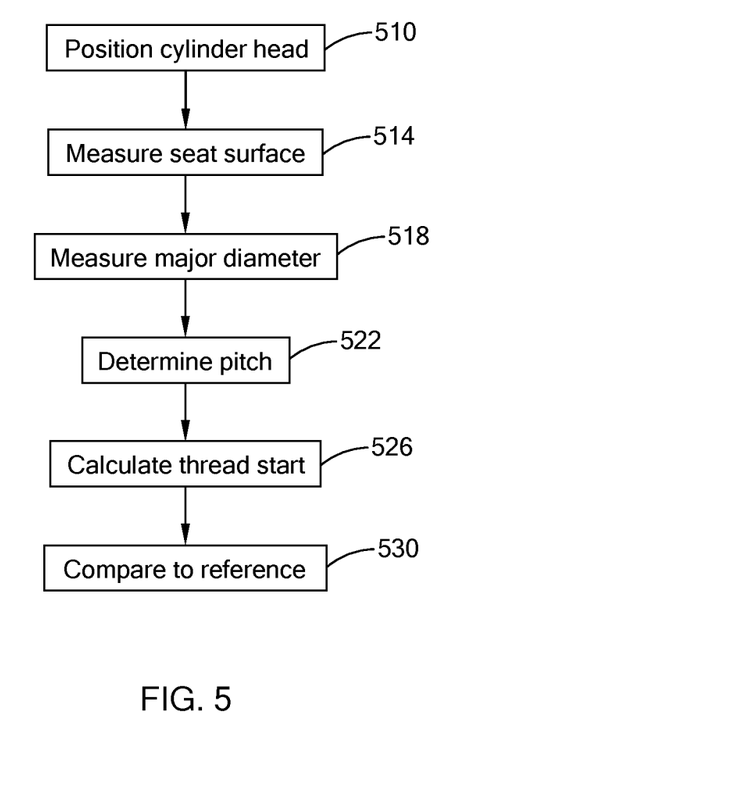
FIG. 5 is flow chart of a method of operating the measurement device of FIG. 3 in accordance with the teachings of the present disclosure.

With additional reference to FIG. 5, a method of operating the measurement device 310 to check the internal thread 134 of the spark plug bore 34 is illustrated in flow chart form. The method includes a step 510 in which the cylinder head 10 is positioned relative to the probe 314 so that the tip 334 can be inserted into and moved within the spark plug bore 34, as shown in FIG. 3. In the example provided, the cylinder head 10 is fixedly mounted or clamped to a stationary surface (not shown) of the measurement device 310 or a fixed table such that a position of the cylinder head 10 remains stationary while the arm 330 moves relative to the cylinder head 10.

The method includes step 514. At step 514, the measurement device 310 measures the z coordinate location of the seat surface 126. The control module 322 controls the base 318 to move the tip 334 to detect a z coordinate position of the seat surface 126. In other words, the base moves the tip 334 until the tip 334 contacts to the seat surface 126 and then the base 318 sends a signal indicative of a z coordinate position of the seat surface 126 to the control module 322. The method can also include setting the axis 118 as the origin for the x and y coordinates so that any location along the axis 118 has the coordinates (0,0,z) with z being the z position along the axis 118. The method can also include setting the z coordinate position of the seat surface 126 to be the origin for the z coordinates so that a location along the plane of the seat surface 126 has the coordinate (x, y, 0). In the example provided, the location where the axis 118 intersects the plane of the seat surface 126 is set as the origin to have the coordinate (0,0,0).

The method includes step 518. At step 518, the measurement device 310 measures the coordinates at the major diameter of the internal thread 134 of the spark plug bore 34. At step 518, the control module 322 controls movement of the arm 330 so that the tip 334 moves along the internal thread 134 and scans the threadforms for the locations that have the greatest diameter (e.g., the major diameter). The control module 322 records the x, y, and z coordinates of each of these locations and stores them as major diameter coordinate sets. Each major diameter coordinate set includes an x, y, and z value for one location.

The method includes step 522. At step 522, the thread pitch is determined. The thread pitch can be measured by the measurement device 310 or can be input to the measurement device 310 by a user (not shown).

The method includes step 526. At step 526, the control module 322 calculates a thread start location 410 (shown on FIGS. 3 and 4). The thread start location 410 is a location where the major diameter of the internal thread 134 would intersect the seat surface 126 if the internal thread continued up the spark plug bore 34 until the seat surface 126. The control module 322 generally calculates the thread start location 410 based on the x, y, and z coordinates of the major diameter coordinate sets, the thread pitch, and the z position of the seat surface 126 (which is set to zero in the example provided).

Figure 4:
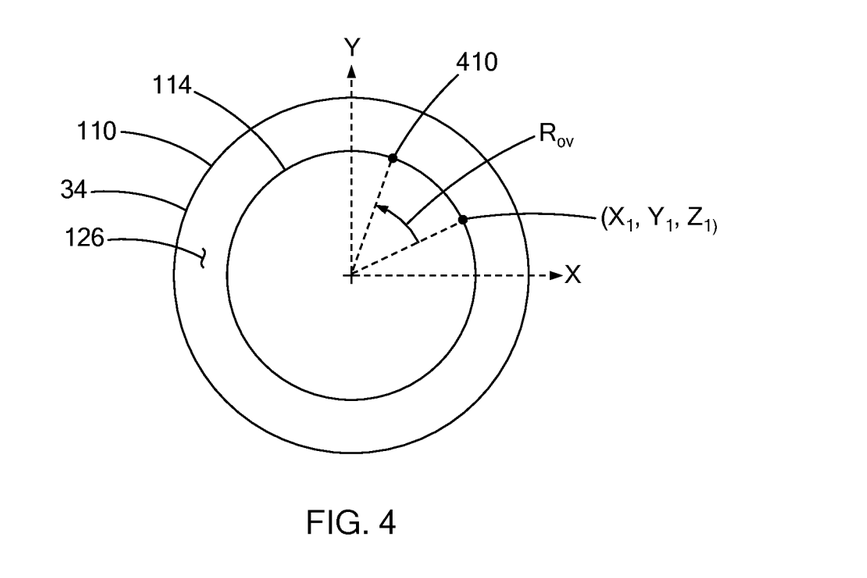
FIG. 4 is a top view of a spark plug bore of the cylinder head of FIG. 3.

The control module 322 can calculate the thread start location 410 by calculating a rotational overshoot from each major diameter coordinate set. The rotational overshoot for a particular major diameter coordinate set can be equal to an angle of rotation between the location at that particular major diameter coordinate set and the start location 410. The control module 322 can calculate the rotational overshoot by first calculating a rotational offset. The rotational offset is equal to the z coordinate of the particular major diameter coordinate set divided by the thread pitch. The rotational offset is the number of rotations that the internal thread 134 would take to reach the start location 410 from the location measured. The control module 322 can then calculate the rotational overshoot, which is equal to the rotational offset minus a maximum integer value of the rotational offset, then multiplied by 360°. The control module 322 can then add the rotational overshoot to an angular position of the particular major diameter coordinate set to yield the start location 410.

For example, if the particular major diameter coordinate set has the values $(x_1, y_1, z_1)$ as shown on FIG. 4, then the rotational offset is provided by the following relationship:

$$R_{off} = z_1/P_t$$

In the above relationship, $R_{off}$ is the rotational offset, $z_1$ is the z coordinate of the particular major diameter coordinate set used, and $P_t$ is the thread pitch of the internal thread 134. In this example, the rotational overshoot is provided by the following relationship:

$$R_{ov} = (R_{off} - R_{off\_int}) * 360$$

In the above relationship, $R_{ov}$ is the rotational overshoot, $R_{off\_int}$ is the maximum integer value of the rotational offset ($R_{off}$). The rotational overshoot $R_{ov}$ provides the rotational angle between the rotational position where the measurement was taken (i.e., at the particular major diameter coordinate set used) and the rotational location of the start location 410. The rotational position of the particular major diameter coordinate set used can be determined based on the values of $x_1$ and $y_1$ and that rotational position can be added to the rotational overshoot to find the start location 410.

The method includes step 530. At step 530, the control module 322 compares the thread start location 410 to a reference location that is where the thread start location should be if the internal thread 134 is properly oriented. This reference location can be stored in memory of the control module 322, or accessed from external memory, or input by a user. The control module 322 is configured to output a signal indicative of the result of this comparison to the display 326. The display 326 can indicate that the internal thread 134 is properly oriented if the thread start location 410 is within predetermined tolerances of the reference location and that the internal thread 134 is improperly oriented if the thread start location 410 is outside the predetermined tolerances. Additionally, the display 326 can indicate the value of the thread start location 410 and a user can determine if it falls within the predetermined tolerances.

Alternatively, the method can include measuring the internal thread 134 at a plurality of locations where the major diameter is detected and calculating the start location 410 for each of the major diameter coordinate sets to determine a plurality of start location values. The plurality of start location values can then be averaged and this average is then compared to the reference location to determine if the average start location value falls within tolerances of the reference location. In one configuration, once the tip 334 finds the major diameter of a threadform, the tip 334 is then moved about the axis 118 in a helical path that corresponds to the pitch of the internal thread 134 while the measurement device 310 measures and stores the major diameter coordinate sets for the plurality of points along the helical path.

These major diameter coordinate sets can then be used to determine a plurality of thread start location values and the average of these values can be compared to the reference location. In another configuration, other scanning paths can be used besides helical, such as moving only in the z direction and measuring the major diameter coordinates of a plurality of the threadforms along the z direction.

While the steps of the methods discussed above are shown in the figures and discussed in a particular order using terms like "after", "next", or "then", it is understood that certain steps can be done simultaneously or in different orders than that specifically described above.

The description of the disclosure is merely exemplary in nature and, thus, variations that do not depart from the substance of the disclosure are intended to be within the scope of the disclosure. Such variations are not to be regarded as a departure from the spirit and scope of the disclosure.

In this application, including the definitions below, the term "module" or the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass tranistory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskel, Go, SQL, R, Lisp, Java®, Fortran, Perl, Pascal, Curl, OCaml, Javascript®, HTML5, Ada, Asp (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for", or in the case of a method claim using the phrases "operation for" or "step for".

What is claimed is:

1. A method of operating a measurement device to check an internal thread of a spark plug bore of a cylinder head for proper orientation of a spark plug in the cylinder head, the method comprising:
    positioning the cylinder head relative to the measurement device;
    measuring a z position of a seat surface, the seat surface being configured to seat the spark plug within the spark plug bore;
    measuring at least one set of coordinates, each set of coordinates at a major or minor diameter of a corresponding threadform of the internal thread;
    determining a pitch of the internal thread;
    calculating a thread start location where the major or minor diameter of the internal thread intersects the seat surface based on the coordinates of the at least one set of coordinates, the pitch of the internal thread, and the z position of the seat surface; and
    comparing the thread start location to a reference location.

2. The method of claim 1, further comprising outputting a result of the comparison of the thread start location to the reference location.

3. The method of claim 1, further comprising defining the z position of the seat surface as a zero z value.

4. The method of claim 1, wherein calculating the thread start location includes calculating a rotational overshoot, the rotational overshoot being equal to an angle of rotation between the thread start location and a location corresponding to the at least one set of coordinates.

5. The method of claim 1, wherein calculating the thread start location includes calculating a rotational offset, the rotational offset being equal to a defined z coordinate of the at least one set of coordinates divided by the thread pitch.

6. The method of claim 5, wherein calculating the thread start location includes calculating a rotational overshoot, the rotational overshoot being equal to the rotational offset minus a maximum integer value of the rotational offset, then multiplied by 360°.

7. The method of claim 6, wherein calculating the thread start location includes adding the rotational overshoot to an angular position of the defined z coordinate.

8. The method of claim 1, wherein the step of measuring the coordinates of the at least one set of coordinates includes moving a probe of a coordinate measuring machine (CMM) within the spark plug bore.

9. The method of claim 8, wherein the probe is moved in a helical path about the spark plug bore while measuring x, y, and z coordinates of the at least one set of coordinates.

10. The method of claim 1, wherein the at least one set of coordinates includes a plurality of sets of coordinates and the step of calculating the thread start location includes calculating a plurality of thread start locations, each thread start location corresponding to one of the sets from the plurality of sets of coordinates.

11. The method of claim 10, further comprising averaging the plurality of thread start locations and comparing the average of the plurality of thread start locations to the reference location.

12. The method of claim 1, further comprising setting a central axis of the spark plug bore as an x and y coordinate origin.

13. A method of operating a measurement device to check an internal thread of a spark plug bore of a cylinder head for proper orientation of a spark plug in the cylinder head, the method comprising:
    positioning the cylinder head relative to the measurement device;
    setting an intersection of a plane of a seat surface and an axis of the bore as a coordinate origin of the measurement device, the seat surface being a surface configured to seat the spark plug within the spark plug bore;
    measuring x, y, and z coordinates for a first location, the first location corresponding to a major or minor diameter of a threadform of the internal thread;
    determining a pitch of the internal thread;
    calculating a thread start location based on the x, y, and z coordinates of the first location and the pitch of the internal thread, the thread start location being a location where the major or minor diameter of the internal thread intersects the seat surface;
    comparing the thread start location to a reference location; and
    outputting a result of the comparison of the thread start location to the reference location.

14. The method of claim 13, wherein calculating the thread start location includes calculating a rotational offset and a rotational overshoot, the rotational offset being equal to the z coordinate of the first location divided by the thread pitch, the rotational overshoot being equal to the rotational offset minus a maximum integer value of the rotational offset, then multiplied by 360°.

15. The method of claim 14, wherein calculating the thread start location includes adding the rotational overshoot to an angular position of the first location.

16. The method of claim 13, further comprising:
measuring x, y, and z coordinates for a plurality of measured locations, each of the measured locations corresponding to a major or minor diameter of a threadform of the internal thread, the first location being one of the plurality of measured locations;
calculating a plurality of thread start locations based on the x, y, and z coordinates of the plurality of measured locations and the pitch of the internal thread, wherein each thread start location is calculated based on the coordinates of a corresponding one of the measured locations;
calculating an average thread start location from the plurality of thread start locations; and
comparing the average thread start location to the reference location.

17. The method of claim 16, wherein the step of measuring x, y, and z coordinates for a plurality of measured locations includes moving a probe in a helical path about the spark plug bore while measuring the coordinates of the plurality of measured locations.

18. A thread gauging device comprising:
a support surface configured to support a cylinder head;
a probe configured to be received in a spark plug bore of the cylinder head and detect characteristics of the spark plug bore;
a base attached to the probe and configured to move the probe relative to the cylinder head;
a display; and
a control module in communication with the base, the probe and the display, the control module being configured to send control signals to the base to control movement of the probe relative to the cylinder head, the control module being configured to receive signals from the probe indicative of the characteristics of the spark plug bore, the control module being configured to move the probe to measure a z position of a seat surface of the spark plug bore, the control module being configured to move the probe to measure at least one set of coordinates, each set of coordinates being at a major or minor diameter of a corresponding threadform of an internal thread within the spark plug bore, the control module being configured to determine a pitch of the internal thread and calculate a thread start location where the major or minor diameter of the internal thread intersects the seat surface based on the coordinates of the at least one set of coordinates, the pitch of the internal thread, and the z position of the seat surface, the control module being configured to compare the thread start location to a reference location, the control module being configured to operate the display to output a result of the comparison of the thread start location to the reference location.

19. The thread gauging device of claim 18, wherein the probe is a touch probe configured to detect characteristics of the spark plug bore by contact between the probe and the spark plug bore.

20. The thread gauging device of claim 19, wherein the probe and control module cooperate to detect x, y, and z coordinates of the characteristics of the spark plug bore.

* * * * *